Feb. 10, 1953 G. B. TOD 2,628,345
VEHICLE SPEED WARNING DEVICE
Filed Aug. 3, 1951 2 SHEETS—SHEET 1
Fig. 1.
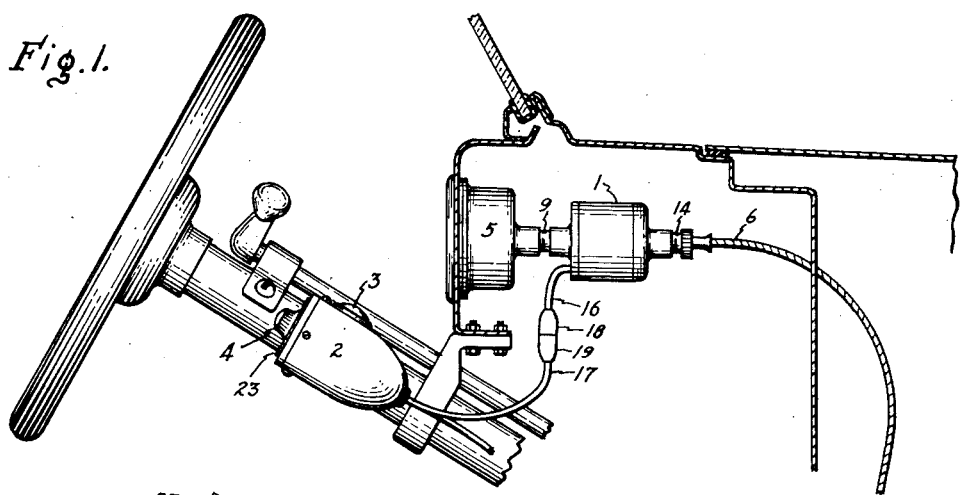
Fig. 2.
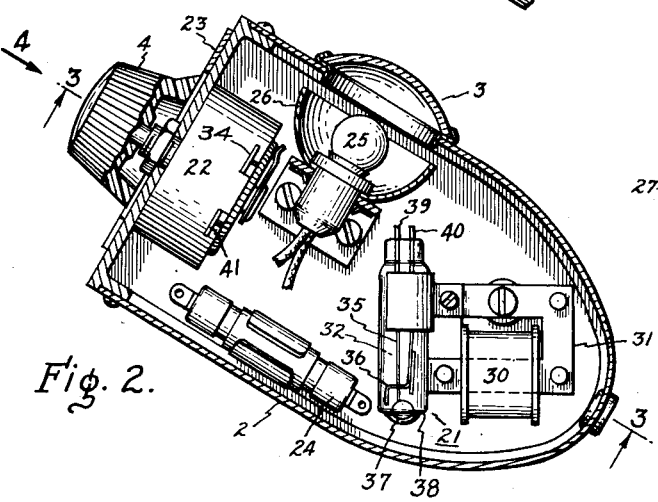
Fig. 4.
Fig. 3.
Inventor
George B. Tod,
by Cushman, Darby & Cushman
His Attorneys Feb. 10, 1953 — G. B. TOD — 2,628,345
VEHICLE SPEED WARNING DEVICE
Filed Aug. 3, 1951 — 2 SHEETS—SHEET 2

Inventor
George B. Tod,
by Cushman, Darby & Cushman
His Attorneys

Patented Feb. 10, 1953

2,628,345

UNITED STATES PATENT OFFICE 2,628,345

VEHICLE SPEED WARNING DEVICE

George B. Tod, Schenectady, N. Y.

Application August 3, 1951, Serial No. 240,147

1 Claim. (Cl. 340—54)

This invention relates to signaling devices and in particular to adjustable overspeed signaling devices for use in an automobile or other vehicle.

It is a primary object of this invention to provide an improved signaling device which is operative in response to a predetermined vehicular speed.

It is another object of this invention to provide an improved speed switch which is operable in response to vehicular speed to indicate a speed above a predetermined, yet variable, setting.

It is a further object of this invention to provide an improved, simple speed switch which is durable and capable of operating for prolonged periods without adjustment.

It is a still further object of this invention to provide an improved speed-sensitive signaling device which is operable directly from a speedometer cable.

It is an additional object of this invention to provide a universal speed-sensitive signaling device which can be installed with minimum effort on practically all automobiles and with almost no alteration of the vehicle or its parts and accessories.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

Briefly, this invention relates to an overspeed sensitive signaling device having a power circuit and an initiating circuit. The power circuit includes a power supply and an indicating device, while the initiating circuit comprises a signal-producing device responsive to vehicular speed, a variable setting rheostat, and a relay operable in response to the initiating signal to actuate the power circuit.

In the drawing,

Figure 1 is shown as a side elevation of a section of the interior of an automobile including a steering column, a dashboard, and a fire wall with my improved speed signaling device mounted relative thereto;

Figure 2 is a front elevation, partly in section, of a portion of the signaling mechanism;

Figure 3 is a partially cut away bottom elevation looking towards plane 3—3 of Figure 2 in the direction of the arrows;

Figure 4 is an end elevation showing the mounting of the mechanism shown in Figure 2 on the steering column;

Figure 5:
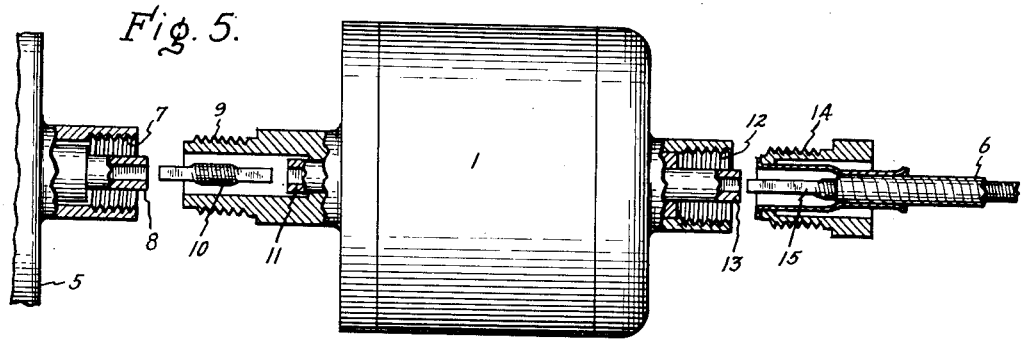
Figure 5 is an exploded side elevation, partly in section, showing the signal-generating element of my improved speed switch positioned for connection between a speedometer casing and cable.

Referring to the drawing, my improved speed switch is shown as comprising a signal-generating device or unit 1, a housing 2, a signaling device 3, and a variable setting knob 4.

While in the following description, reference is made to a particular embodiment, it is to be understood that such a reference has been chosen only as an example to point out more clearly the operating principles and features of my improved speed switch, and it is not intended as a limitation on the scope of my invention.

Signal-generating unit 1 in a preferred embodiment is a tachometer generator of a conventional type having a permanent magnet field and a wound rotor which, in cutting the flux lines of the field, produces a voltage signal proportional to its speed of rotation. To provide for the driving of signal-generating unit 1, it is interpositioned between a speedometer 5 and a speedometer cable 6. Each end of the signal generator is provided with suitable threaded couplings for connecting the generator to the speedometer and speedometer cable.

At this point, it should be noted that practically all standard American automobiles marketed in recent years are equipped with the same type of speedometer cable and cable casing. The only variation lies in the fact that there are two types of casing connectors for connecting a speedometer cable to a speedometer. Consequently, screw connections are chosen for the signal-generating unit which adapt it for connection with either type of casing connector. In Figure 5, for example, one type speedometer 5 is shown having a threaded female coupling or bore 7 with a rotating element 8 positioned axially thereof.

Accordingly, signal-generating unit 1 is provided at one end with a male connector 9 engageable with the female threaded bore 7. A short connecting element 10 is used between rotating element 8 and a corresponding bushing 11 within the signal-generating unit 1. Obviously, connecting element 10 could be integral with signal-generating unit 1.

At its opposite end, the signal-generating device is provided with a female connector 12 having an internal threaded bore corresponding to bore 7 in the end of the speedometer 5. As with bore 7, female connector 12 is provided with a rotating element 13 which corresponds with the element 8 in coupling 7.

In the embodiment shown in Figure 5, cable 6 is provided with a male connector 14 which corresponds to male connector 9 on the signal-generating unit 1. The interior, rotating element of cable 6 has a connecting element 15 contoured to correspond to connecting element 10.

The signal produced by the signal-generating device 1 is carried by insulated electrical conductors 16 and 17 to the housing 2. For convenience, conductors 16 and 17 (Figure 1) are provided with suitable connectors 18, 19, respectively, to permit their removable interconnection.

Housing 2, which is supported by a clamp or bracket 20 (Figure 4) encloses a relay 21, a variable setting resistor or rheostat 22, a dial 23, a flashing unit 24, and a signaling lamp 25 mounted in a suitable reflector 26.

Housing 2 can have any shape compatible with good design, and it is intended primarily to present an enclosure which is appealing to the eye, while functioning as a suitable support for some of the elements of my improved speed switch. In a preferred embodiment, housing 2 is mounted on a vehicle's steering column. While this mounting means is not intended to be a limitation on the scope of this invention, it does add to its universality. For example, referring to Figure 4, bracket 20 comprises a U-shaped element 27, a corresponding notched member 28 integral with housing 2 and suitable means, such as screws 29, for holding element 27 in engagement with member 28 about a steering column. Obviously, U-shaped element 27 could be adjustable to fit around a variety of diameters of steering columns.

Relay 21 comprises a coil 30, a core 31, and a hermetically sealed contact 32. Coil 30, as shown in the wiring diagram of Figure 6, has one terminal 33 connected directly to the signal-generating unit 1 and its other terminal connected to one of the terminals 34 of the variable resistor 22.

Hermetically sealed contact 32 comprises one of those standard electrical units available on the market which has a fixed contact 35 and a movable contact 36 sealed along with a pool of mercury 37 within a glass envelope 38. Movable contact 36 is positioned to be magnetically attracted by a magnetomotive force produced in core 31. At a certain magnetomotive force, movable contact 36 is pulled into the pool of mercury 37 to establish an electrical connection across the contacts 35, 36. In the absence of the certain magnetomotive force movable contact 36 springs out of the pool of mercury to sever the electrical connection across contacts 35, 36. Contacts 35, 36 are brought through the envelope 38 to provide terminals 39, 40 respectively.

When an adequate current is passed through the coil 30, a magnetomotive force is produced in core 31 to electrically connect terminals 39, 40; that is, a signal is produced by a signal-generating device 1 which causes a current to flow through coil 30 to set up a magnetomotive force which pulls the movable contact 36 into mercury pool 37 to establish a circuit across terminals 39, 40.

In order that a complete circuit will be established from the signal-generating unit 1 through coil 30 and variable resistor 22, the second terminal 41 of the variable resistor is connected back to the signaling unit 1.

Variable resistor 22 is so chosen through calibration or trial that it will cause hermetically sealed contactor 32 to operate at any predetermined speed within a chosen range; for example, a range of thirty through seventy miles per hour. By placing variable resistor 22 in electrical series with coil 30, the current flow through the coil 30, and hence the magnetomotive force produced in core 31, is controlled by resistor 22. For a low vehicular speed setting, for example, thirty miles per hour, a low resistance is chosen for resistor 22, whereupon a minimum voltage is required to force adequate current through coil 30 to produce the required magnetomotive force to close contactor 32. On the other hand, for a high vehicular speed setting, say seventy miles per hour, a high resistance is given to resistor 22. Consequently, a much higher output voltage is required from signal-generating device 1 before adequate current is passed through coil 30 to produce the predetermined magnetomotive force required for the operation of hermetically sealed contactor 32.

With such a structure, an initiating circuit is provided through the signal-generating device 1, relay 21, and variable resistor 22 wherein these elements have reasonably fixed electrical properties permitting uniform operation of the initiating circuit irrespective of normal temperature or climatic changes.

Figure 6:
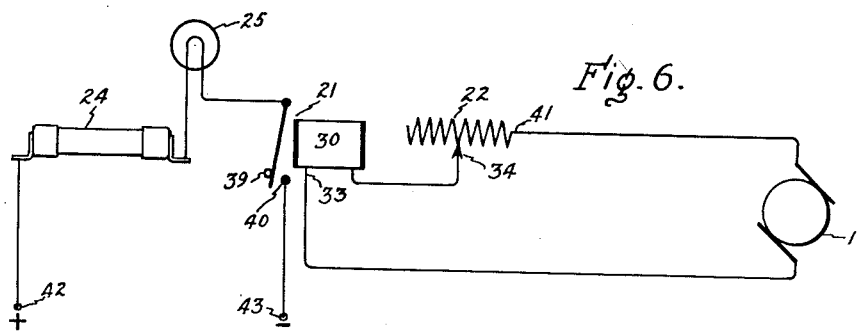
Figure 6 is a schematic wiring diagram of my improved speed switch.

The power circuit in the embodiment of my invention shown in Figure 6 comprises a terminal 42, flasher unit 24, indicating lamp 25, and terminal 43, all interconnected by suitable leads. Terminals 39, 40 of contactor 32 are positioned between lamp 25 and terminal 43 to function as a switch to control the energization of the power circuit.

The power circuit, and particularly terminals 42, 43, can be connected to any of the principal lighting or ignition circuits within an automobile. Consequently, when the power circuit is energized by relay 21, lamp 25 glows to indicate an overspeed condition. The flasher unit 24 is connected in series to serve the purpose of providing an intermittent and, therefore, more apparent signaling medium.

It becomes immediately obvious that signaling device 25 need not be limited to a lamp, nor need it even be limited to a flashing lamp controlled by flasher unit 24. Signaling unit 25, for example, could comprise a horn, bell, or other audible, visible, or combined audible and visible signaling device operable in response to the completion of a circuit across relay 32.

A principal feature of employing both an initiating and power circuit as disclosed is that a much lower current is required to operate the initiating circuit than would be required if the signaling device 25 and flasher unit 24 were in the same circuit. Consequently, a small inexpensive generating unit 1 can be used and the problems and variable electrical conditions produced by a current value high enough to operate signaling device 25 are not encountered.

Figure 7:
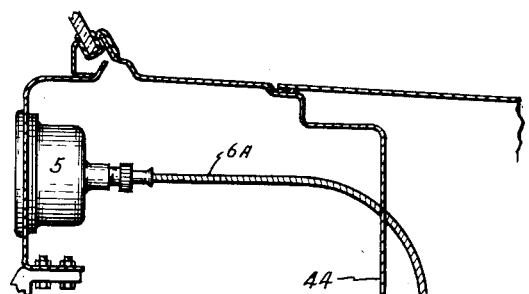
Figure 7 is a side elevation of a second mounting embodiment of my signal-generating element.

While the operating elements of a preferred embodiment of my invention have been described in detail, it is obvious that modifications will become apparent to those skilled in the art. For example, in Figure 7 the signal-generating device 1 is positioned on the engine side of the fire wall 44 rather than adjacent the speedometer 5. This arrangement requires the use of short adapting speedometer cable 6A in place of the connecting element 10, but otherwise provides for a more convenient installation of signal-generating device 1 when space limitations demand it.

Figure 8:
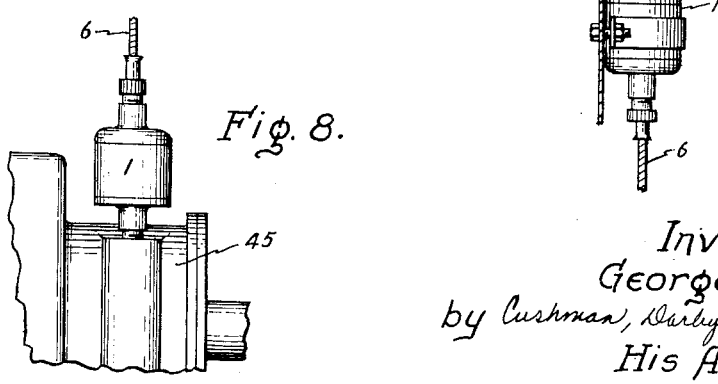
Figure 8 is a top elevation of still another mounting embodiment for my signal-generating element.

A still further mounting position for signal-generating unit 1 is shown in Figure 8 wherein the generating device 1 is mounted directly on the vehicle's transmission housing 45 and connected to the speedometer take-off gear (not shown). Here, speedometer cable 6 is connected to the other end of the signal-generating device instead of transmission 45.

To facilitate the convenient setting for a predetermined vehicular speed at which the lamp 25 will glow, variable resistor 22 is provided with a suitable handle 4 including a pointer 47 which reads against scale 23.

Scale 23, which is secured to housing 2 by some conventional means, is calibrated in miles per hour. With such a structure, an operator selects a suitable maximum operating speed by setting pointer 47 relative to scale 23. For example, Figure 4 shows a setting of 50 miles per hour.

In operation, then, the operator, depending upon weather and road conditions, chooses a speed which he does not wish to exceed. This speed is set, as heretofore described, by adjusting pointer 47 relative to scale 23. The vehicle may then be driven in its normal manner, and when a speed equal to or greater than the selected speed has been reached, the initiating circuit will be energized to close the power circuit, thereby operating the signaling unit 25; but when a speed of less than the selected speed is maintained, the initiating circuit will not possess enough voltage to close the power circuit, and the signaling unit will be inoperative.

This invention provides a simple, unique device usable on practically all American-made cars. It is inexpensive and will provide a safety factor not heretofore known in driving, without interfering in any manner with the normal operation of the vehicle.

Modifications of this invention will occur to those skilled in the art, and it is desired to be understood, therefore, that this invention is not intended to be limited to the particular embodiment disclosed, but rather it is intended to cover all modifications which are within the true spirit and scope of this invention.

I claim:

An adjustable speed warning device for use with a vehicle having a speedometer cable, a generating element having means adapted for operative connection to the said speedometer cable of the vehicle to generate a voltage proportional to the speed of the vehicle, a normally open circuit including a source of energy independent of said generator means operable by the generator output for completing said normally open circuit when the generator output reaches or exceeds a predetermined value to thereby actuate a warning device, variable resistance means for varying the power supply to said circuit completing means from said generator to provide for operation of said warning device at any selected vehicle speed, said variable resistance and said warning device being carried by the vehicle, and means for manually operating said variable resistance means cooperating with suitable indicia whereby said variable resistance may be changed, in accordance with the said selected vehicle speed.

GEORGE B. TOD.

REFERENCES CITED

The following references are of record in the file of this patent:

UNITED STATES PATENTS

| Number | Name | Date |
| --- | --- | --- |
| 622,351 | Hausburg | Apr. 4, 1899 |
| 1,248,130 | Kammerhoff | Nov. 27, 1917 |
| 1,557,291 | Jacobs | Oct. 13, 1925 |
| 2,249,389 | Kolb | July 15, 1941 |
| 2,268,836 | Linga | Jan. 6, 1942 |